(12) United States Patent
Piekarz

(10) Patent No.: US 7,756,550 B2
(45) Date of Patent: Jul. 13, 2010

(54) HANDS FREE DEVICE FOR A CELLULAR PHONE

(75) Inventor: Roman Piekarz, Mielec (PL)

(73) Assignee: Bury Sp.z.o.o., Mielec (PL)

(*) Notice: Subject to any disclaimer, the term of this patent is extended or adjusted under 35 U.S.C. 154(b) by 775 days.

(21) Appl. No.: 11/419,599

(22) Filed: May 22, 2006

(65) Prior Publication Data

US 2006/0264246 A1     Nov. 23, 2006

(30) Foreign Application Priority Data

May 23, 2005   (DE)   ................ 10 2005 024 164

(51) Int. Cl.
*H04M 1/00* (2006.01)
(52) U.S. Cl. .............. 455/569.1; 455/569; 455/41; 455/41.2
(58) Field of Classification Search ............. 455/569.1, 455/564, 41.1, 116; 342/357.06
See application file for complete search history.

(56) References Cited

U.S. PATENT DOCUMENTS

| | | | |
|---|---|---|---|
| 6,158,793 A | | 12/2000 | Castro |
| 6,505,121 B1 | | 1/2003 | Russell |
| 7,215,279 B1 | * | 5/2007 | Poindexter et al. ..... 342/357.06 |
| 2002/0032042 A1 | * | 3/2002 | Poplawsky et al. .......... 455/564 |
| 2002/0063637 A1 | | 5/2002 | Eida |
| 2002/0177472 A1 | * | 11/2002 | Tomoda et al. ............... 455/569 |
| 2003/0013483 A1 | * | 1/2003 | Ausems et al. .............. 455/556 |
| 2003/0013501 A1 | | 1/2003 | Malhotra |
| 2004/0185915 A1 | * | 9/2004 | Ihara et al. ................ 455/569.1 |
| 2006/0058070 A1 | | 3/2006 | Chang |
| 2006/0073796 A1 | * | 4/2006 | Collavo et al. .............. 455/116 |
| 2006/0094355 A1 | * | 5/2006 | Lin ........................... 455/41.1 |

FOREIGN PATENT DOCUMENTS

| | | |
|---|---|---|
| DE | 296 14 668 U1 | 8/1996 |
| DE | 101 03 610 A1 | 1/2001 |
| DE | 101 10 535 A1 | 5/2001 |
| EP | 1 414 225 A1 | 4/2002 |
| EP | 1 473 913 A1 | 11/2004 |
| WO | WO 00/72463 A2 | 11/2000 |

OTHER PUBLICATIONS

Nokia Bedienungsanleitung Installationsanleitung, Nokia 610 Profi Funk-Kfz-Einbausatz. 2004, pp. 1-12.
German Office Action.

* cited by examiner

*Primary Examiner*—Charles N Appiah
*Assistant Examiner*—Michael T Vu
(74) *Attorney, Agent, or Firm*—Whitham Curtis Christofferson & Cook, PC

(57) ABSTRACT

A hands free device for a cellular phone which has a telephone transceiving unit for a mobile radio network and in addition a communication device for the wireless transmission of audio and data signals, with a housing in which a communication device forming a wireless communication connection with the communication device of the cellular phone is located, provides for the activation by a cellular phone without or at least without voluminous permanent installations in a motor vehicle in that a telephone transceiving unit for a mobile radio network is integrated in the housing, which telephone transceiving unit is set up for receiving user-specific data from a cellular phone via the communication device and providing a user-specific cellular phone function, specified by the user-specific data, through the telephone transceiving unit, the telephone transceiving unit is connected to a display in the housing and the housing has a power supply connection and an antenna connection.

12 Claims, 2 Drawing Sheets

HANDS FREE DEVICE FOR A CELLULAR PHONE

BACKGROUND OF THE INVENTION

1. Field of the Invention

The invention relates to a hands free device for a cellular phone which has a telephone transceiving unit for a mobile radio network and in addition a communication device for the wireless transmission of audio and data signals, with a housing in which a communication device forming a wireless communication connection with the communication device of the cellular phone is located.

2. Description of the Related Art

Such hands free devices are known. They have a holder into which the cellular phone can be inserted. The wireless communication devices are constructed in accordance with a standard, namely the Bluetooth standard. The holder is normally connected to a control box installed in the vehicle via which the audio signals transmitted by the cellular phone are forwarded, for example, to a loudspeaker. Conversely, audio signals picked up by a microphone can be transmitted to the telephone and radiated by the telephone via the telephone transmitter unit. The disadvantageous factor in this known system is that there is a not inconsiderable space requirement for the permanently installed parts of the hands free device which is not always available in motor vehicles.

SUMMARY OF THE INVENTION

The present invention is based on the object, therefore, of constructing a hands free device of the type initially mentioned in such a manner that no parts, or only parts of small volume, must be permanently installed and a cellular phone function can be easily activated.

To achieve this object, according to the invention, a hands free device of the type initially mentioned is characterized by the fact that a telephone transceiving unit for a mobile radio network is integrated in the housing, which telephone transceiving unit is set up for receiving user-specific data from a cellular phone via the communication device and providing a user-specific cellular phone function, specified by the user-specific data, through the telephone transceiving unit, that the telephone transceiving unit is connected to a display in the housing and that the housing has a power supply connection and an antenna connection.

The hands free device according to the invention with integrated cellular phone module can thus be accommodated in a single housing which is provided with a display and thus provides for comfortable operation. The housing can be unproblematically mounted in the passenger space of a motor vehicle, preferably by means of a plug-in foot, appropriately within the field of view of the driver, at a point at which no disturbance of the traffic perception is to be feared.

The hands free device is supplied with power via the cable brought out of the housing, in the simplest way by plugging in to a cigarette lighter contact, as a result of which the cable must run over a certain length in the passenger space.

By interrogating the user-specific data of an external cellular phone which only needs to be located within radio range, via the wireless communication connection, the user-specific functions of the external cellular phone are available in the internal cellular phone module. For this purpose, for example, the so-called rSAP standard can be used. The telephone transceiving unit is then activated for as long as the wireless communication link to the external cellular phone exists. The latter can no longer be reached for calls and can not set up any calls, either. The external cellular phone is thus largely deactivated. It is only possible to access the user-specific data, stored in the SIM card and possibly a read-only memory of the cellular phone, via the wireless communication link. The cellular phone function of the cellular phone module integrated in the housing can thus be activated automatically without plug-in connection.

As an alternative thereto, a connection box, to which a supply voltage and any loudspeakers and/or microphones installed can be connected and which is installed permanently (and hidden) in the vehicle, can be connected to the cable. The connection box requires extremely little installation space which is always available in a suitable manner. In this embodiment, the cable can be run from the housing along a short path hidden, for example, behind the dashboard.

In a preferred embodiment of the invention, the housing is constructed of two parts and consists of a permanently mountable plug-in foot and a display part which can be connected thereto in a locking manner.

If the housing has at least one inbuilt loudspeaker, but preferably at least two inbuilt loudspeakers for a reproduction in stereo quality, the connection to an external loudspeaker can be omitted so that the hands free device does not need to use inbuilt loudspeakers. If, however, a connection to an external loudspeaker is established, for example via the connection box, the loudspeakers built into the housing are switched off. The loudspeakers are suitably in the display part of the housing constructed in two parts.

It is advantageous to use a hands free device, installed subsequently, with a microphone which can be suitably positioned. Accordingly, it is appropriate if the housing is connected with a connection socket for an external microphone. This connection socket, too, is preferably accommodated in the display part in the case of a housing constructed in two parts.

In contrast, the power supply, that is to say the power supply cable leading away from the housing, is brought out of the plug-in foot in the two-part housing.

The hands free device according to the invention with its display can be suitably also used for supporting the driver in route selection. The housing can be provided without great additional expenditure with an antenna receiving traffic radio messages and an evaluating circuit decoding the traffic radio messages, the antenna suitably being accommodated in the plug-in foot of the housing constructed of two parts. In addition, this or another antenna can be integrated in the plug-in foot, or connected to the plug-in foot, for the mobile radio communication.

The operating unit of the hands free device is preferably arranged on a top side of the display part. Supplementing this or as an alternative, the operating unit can be advantageously also constructed as a wireless remote control which can be subsequently mounted at a suitable position, for example on the steering wheel, and can be constructed as infrared or radio remote control. Particularly with such a type of operating unit, dialing signals can also be transmitted via the hands free device by means of the wireless communication link to the cellular phone. The dialing device can thus be initiated by the driver himself, for example at the steering wheel so that the distraction from the traffic happening, which is associated with the dialing process, can be kept at a minimum.

BRIEF DESCRIPTION OF THE DRAWINGS

In the text which follows, the invention will be explained in greater detail with reference to the exemplary embodiments shown in the drawing, in which.

DETAILED DESCRIPTION OF THE PREFERRED EMBODIMENT

Figure 1:
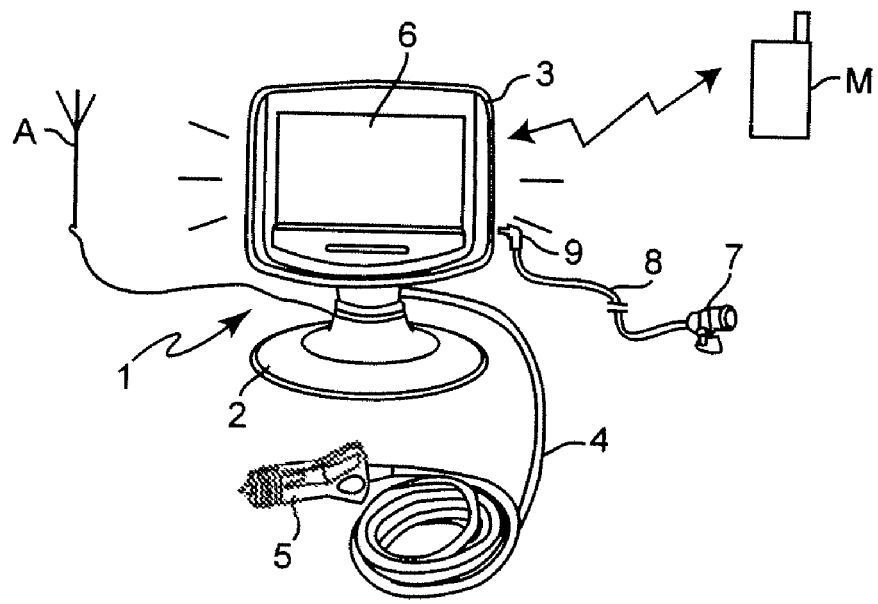
FIG. 1 shows a diagrammatic representation of a hands free device according to a first embodiment of the invention with a connecting cable for power supply and antenna connecting cables.
Figure 2:
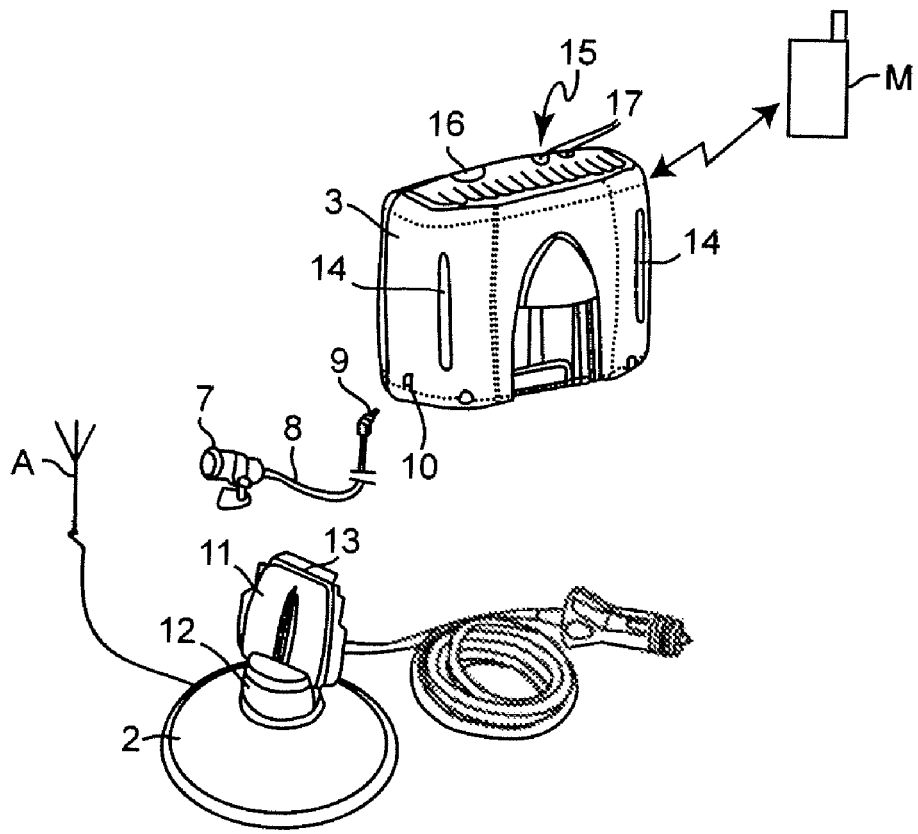
FIG. 2 shows two parts of the housing of the hands free device according to FIG. 1 in separated form.

The hands free device shown in FIGS. 1 and 2 has a housing 1 which is formed from a plug-in foot 2 and a display part 3. From the plug-in foot 2 of the housing 1, a power supply cable 4 is brought out which has at its end a connector 5 which can be contacted with a cigarette lighter plug contact of a motor vehicle in order to thus supply the on-board voltage of the motor vehicle to the hands free device.

In the housing 1, a telephone transceiving unit (not shown) is integrated which forms a complete cellular phone module. The telephone transceiving unit is connected to an external antenna A via an antenna connecting cable. To enable the cellular phone module to operate in a mobile radio network, user-specific data are required which are usually stored in a SIM card. According to the present invention, a wireless communication connection to an external cellular phone M is set up by means of a communication device preferably in accordance with the Bluetooth standard, in order to access the user specific data stored in the cellular phone M on its SIM card or on a read only memory. The telephone transceiving unit integrated in the housing 1 takes over the complete functionality of the external cellular phone M which, in turn, is largely deactivated. Incoming calls for the telephone number for which the external cellular phone M is actually enabled are now received by the telephone transceiving unit. Due to the access to the user-specific data, the other data such as directory entries, signaling settings, supplementary programs etc. available in the external cellular phone M are also available in the telephone transceiving unit.

Activation of the hands free device and the telephone transceiving unit integrated in it thus only requires an external cellular phone M to be located within radio range of the hands free device and to have a communication device which, technically and with regard to access parameters, provides for a communication connection to the communication device of the telephone transceiving unit. According to the present prior art, the cellular phone M should have a Bluetooth interface and support the rSAP standard.

The display part 3 of the housing 1 has at its front a display 6 for displaying telephone data, for example the number of a subscriber dialed or of a caller. An external microphone 7 which can be connected to the hands free device with a connecting cable 8 and a conventional connecting plug 9 to a microphone socket 10 mounted on the side of the display part 3 of the housing 1, can be connected to the display part 3.

FIG. 2 illustrates that the display part 3 can be plugged onto the plug-in foot 2. For this purpose, the plug-in foot 2 has a rectangular connector 11 which is attached to the plug-in foot 2 by means of a ball joint 12. The rectangular connector 11 is provided with plug-in contacts 13 which are accessible from the top and by means of which the electrical connection to the display part 3 can be established when the display part 3 is pushed onto the rectangular connector 11 from top to bottom in order to establish a locking connection of the display part 3 with the plug-in foot 2.

In the display part 3, there is a communication device which can establish and maintain a wireless communication connection according to the Bluetooth standard to an external cellular phone M having a corresponding communication device. In this manner, the user-specific data of the cellular phone M reach the hands free device and can be utilized for activating the telephone transceiving unit (cellular phone module).

The display part 3 has at its rear or on its side walls two inbuilt loudspeakers which radiate the sound through associated outlet slots 14. In FIG. 1, the sound radiation in stereo quality to both sides of the display part 3 is symbolized by dotted lines. The connected microphone 7 can thus be used for performing the hands free functions of the hands free device.

A telephone call is conducted via the telephone transceiving unit in the housing 1, enabled by the user-specific data of the external cellular phone. The external cellular phone M only needs to maintain the Bluetooth communication connection to the hands free device and, therefore, does not have a fixed location. For example, the cellular phone M can remain in a jacket pocket of the driver of the motor vehicle for activating the functionality of the mobile radio module.

To control the telephone functions, the housing 1 is provided with an operating device 15 which consists of an on/off key 16 and two keys 17 by means of which the acceptance and the termination of telephone calls, the control of the loudspeakers and the "pairing" of the Bluetooth communication devices is controlled. The "specific pairing" is used for adjusting the communication protocol in accordance with the Bluetooth standard and adjusting the two communication devices to one another for establishing the wireless communication connection.

Figure 4:
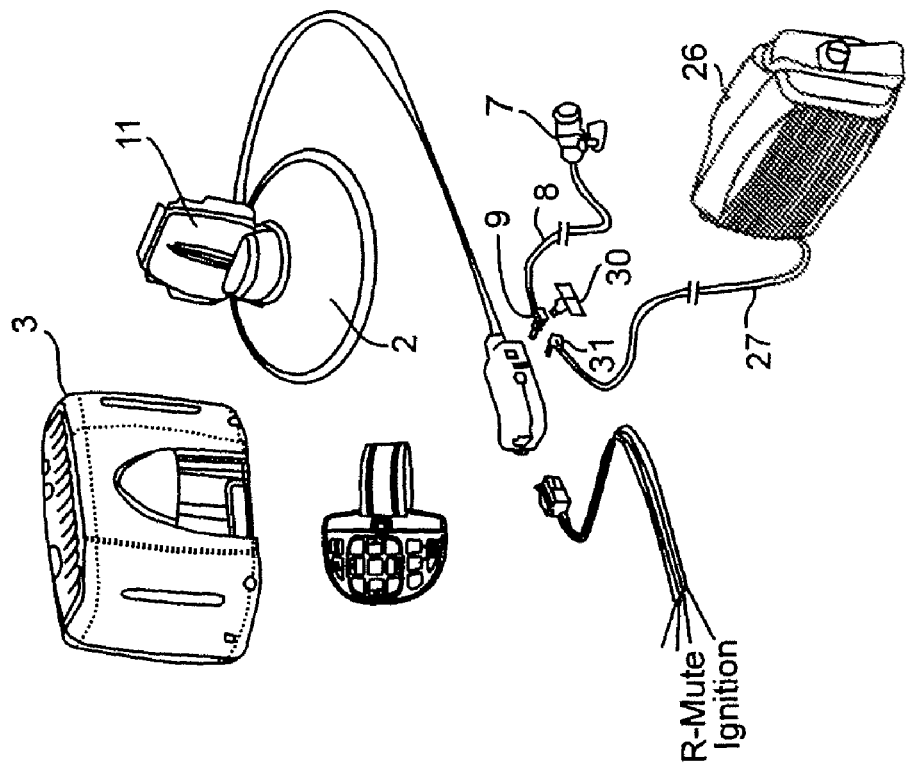
FIG. 4 shows the hands free device according to FIG. 3 with separated parts of the housing.
Figure 3:
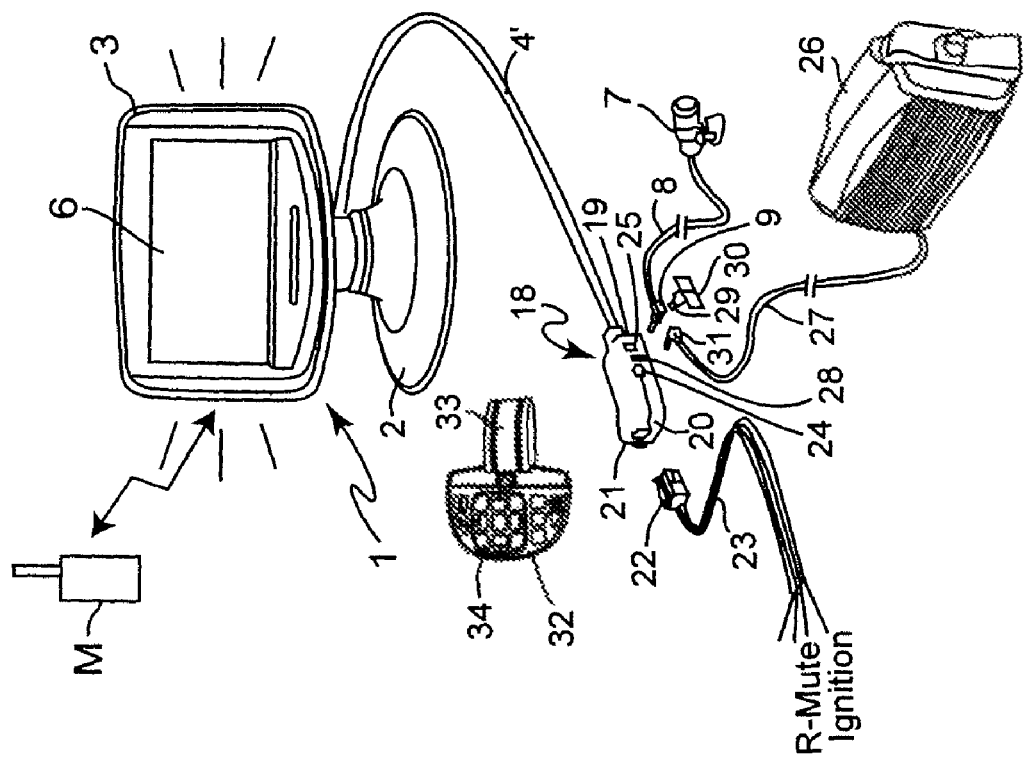
FIG. 3 shows a diagrammatic representation of a hands free device according to a second embodiment of the invention.

In the second exemplary embodiment of the invention, shown in FIGS. 3 and 4, the housing 1 is constructed virtually identically. Only the cable 4' which is brought out of the plug-in foot 2 ends in a connection box 18 and is brought into a first small end side 19 of the connection box 18. The opposite end side 20 of the connection box 18 has a connector socket 21 for contacting a connector 22 of a control cable 23. The control cable 23 carries a supply voltage +, − and control signals for muting a car radio (R mute) from the telephone and a signal characterizing the state of ignition (ignition) from the standard terminal 15 of the car electronics. By means of the signal of an incoming call, transmitted by the activated cellular phone module, the car radio located in the motor vehicle is thus muted by the hands free device via the control cable 23 so that the telephone call is not disturbed. The signal "ignition" characterizing the state of the ignition is correspondingly picked up by the hands free device in order to switch it on and off and possibly transmit it via the wireless communication device to the cellular phone module in the housing 1 in order to thus signal the operational readiness of the hands free device.

In this embodiment, a loudspeaker 26 and/or the external microphone 7 can be connected via a loudspeaker cable 26 or the microphone cable 8 to corresponding sockets 24, 25 in a jacket wall of the cylindrical connection box 16. Between the connection sockets 24, 25, the connection box 16 has a locking recess 28 into which locking ridges 29 of a cover 30 can be locked. The cover 30 can be used for securing the connector 31 attached to the end of the loudspeaker cable 27 and/or the connector 9 of the microphone cable 8.

In this embodiment, the display part 3 is equipped with a remote control receiver (not shown) in the form of an infrared or radio receiver so that the hands free device can be operated via a remote control 32 which can be attached to the steering wheel of the motor vehicle by means of an adjustable attachment band 33. The remote control can have, in particular a key dialing pad 34 in order to control a dialing process of the cellular phone module.

The hands free device according to the invention thus enables a cellular phone module of the hands free device to be activated which establishes and maintains a telephone connection with its own telephone transceiving unit. It is only the user-specific data of an external cellular phone M which are transmitted via the wireless communication connection to the hands free device by means of which the hands free function can be autonomously performed with the microphone 7 and the loudspeaker 26 or, respectively, the inbuilt loudspeaker 14.

In the housing 1, a data interface, for example a USB connection can be optionally integrated in order to update the control software contained in the housing 1, to transmit program and user data for the cellular phone module from and to external devices and, in particular, to reproduce audio data contained in an external device, for example a USB data memory, in one or more channels (mono, stereo, Dolby surround etc.) via the loudspeaker reproduction function of the hands free device.

A SIM card reader, not shown, can also be optionally integrated in the housing 1 in order to introduce a SIM card used for cellular phones and containing user-specific data into the SIM card reader and to transmit the data contained in the SIM card for utilization by the cellular phone module. By insertion of a SIM card, the cellular phone function can thus be activated.

The cellular phone module of the hands free device should preferably have a hands free functionality and head set functionality in a manner known per se in order to provide the hands free function also in connection with non-rSAP-capable cellular phones. The hands free profile regulates the communication between hands free device and cellular phone in order to set up voice connections with the cellular phone and to remotely control the latter. The head set profile regulates the communication between cellular phone and an external loudspeaker and microphone and the remotely controlled or automatic call acceptance.

The invention claimed is:

1. A hands free device for a cellular phone, comprising: a telephone transceiving unit for a mobile radio network; a communication device for wireless transmission of audio and data signals, said communication device being configured to communicate by wireless communication with a cellular phone; and a housing, wherein said telephone transceiving unit and said communication device are located in the housing, wherein the telephone transceiving unit is set up for receiving user-specific data from a cellular phone via the communication device and for providing a user-specific cellular phone function specified by the user-specific data, through the telephone transceiving unit, wherein said housing has a display and the telephone transceiving unit is connected to the display, wherein the housing has a power supply connection and an antenna connection, and wherein the housing is constructed of two parts and includes a permanently mounted plug-in foot and a display part which can be connected thereto in a locking manner.

2. The hands free device as claimed in claim 1, wherein the housing has at least one inbuilt loudspeaker.

3. The hands free device as claimed in claim 1, wherein the housing has at least one inbuilt loudspeaker and the at least one loudspeaker is built into the display part of the housing.

4. The hands free device as claimed in claim 1, wherein the housing is provided with a connection socket for an external microphone.

5. The hands free device as claimed in claim 1, wherein the housing is provided with a connection socket and the connection socket is arranged on the display part.

6. The hands free device as claimed in claim 1 further comprising a power supply cable with a connector for contacting a cigarette lighter, said power supply cable providing power to said housing.

7. The hands free device as claimed in claim 1 further comprising a power supply cable connected to a connection box, configured for permanent installation, to which one or more of a supply voltage, loudspeakers, and microphone can be connected.

8. The hands free device as claimed in claim 1 further comprising a power supply cable and an antenna connection cable respectively connectable to the power supply connection and the antenna connection at the plug-in foot by plug-in connections.

9. The hands free device as claimed in claim 1 further comprising, an antenna arranged in the plug-in foot of the housing.

10. The hands free device as claimed in claim 1 further comprising an antenna which receives traffic radio messages, and an evaluating circuit which decodes the traffic radio messages arranged in the housing.

11. The hands free device as claimed in claim 1 further comprising an operating unit arranged on a top side of the housing.

12. The hands free device as claimed in claim 1 further comprising an operating unit constructed as a wireless remote control for the hands fee device.

* * * * *